United States Patent [19]

Burke

[11] 4,388,717
[45] Jun. 14, 1983

[54] CONFERENCE CIRCUIT FOR PCM SYSTEM

[75] Inventor: Michael G. Burke, Corinth, Miss.

[73] Assignee: International Telephone and Telegraph Corporation, New York, N.Y.

[21] Appl. No.: 224,970

[22] Filed: Jan. 14, 1981

[51] Int. Cl.³ .......................................... H04Q 11/04
[52] U.S. Cl. .................................. 370/62; 179/18 BC
[58] Field of Search .......... 370/62; 179/1 CN, 18 BC

[56] References Cited

U.S. PATENT DOCUMENTS

| | | | |
|---|---|---|---|
| 3,699,264 | 10/1972 | Pitroda et al. | 179/18 BC |
| 4,007,338 | 2/1977 | McLaughlin | 370/62 |
| 4,022,981 | 5/1977 | McLaughlin et al. | 179/18 BC |
| 4,022,991 | 5/1977 | Kelly et al. | 370/62 |
| 4,224,688 | 9/1980 | Ciancibello et al. | 370/62 |

Primary Examiner—Jin F. Ng
Attorney, Agent, or Firm—James B. Raden; Marvin M. Chaban

[57] ABSTRACT

A conference circuit capable of controlling a plurality of conferences in PCM format. In this system, a person calling a party busy in a two party conversation and wishing to notify the called party of the call initiates camp-on service. The call is transferred to conference channels. The conference circuit performs a comparison between the loudness of the speech sample from each party in a conference to transmit the loudest sample for a second comparison. The second comparison is made against signals generated for providing camp-on tone to existing calls. The loudest sample output indicated by the second comparison is transmitted to the stations of the conference other than the one having generated the loudest signal.

4 Claims, 10 Drawing Figures

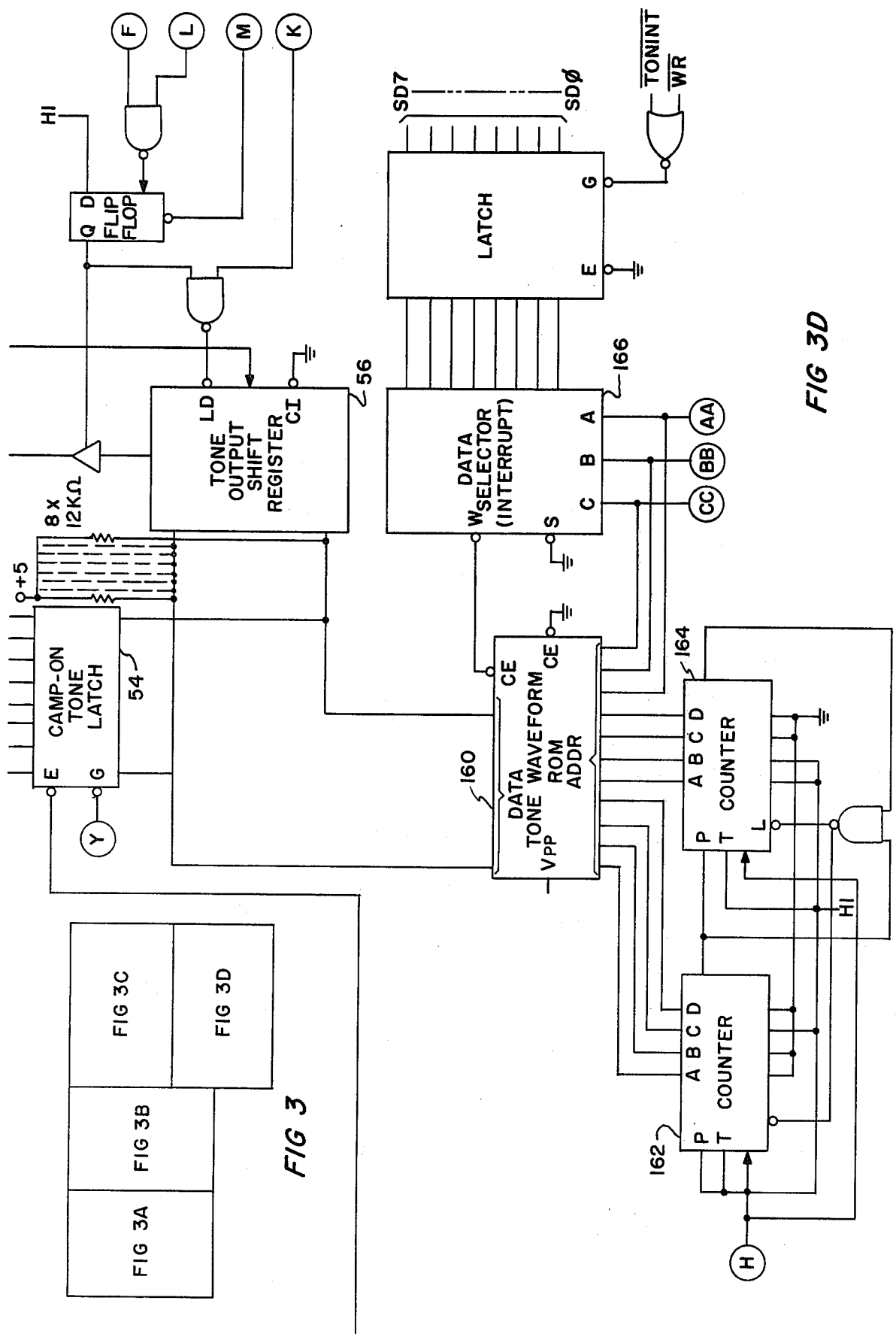

CONFERENCE CIRCUIT FOR PCM SYSTEM

BACKGROUND OF THE INVENTION

The present invention is directed to a conference circuit of the type using a comparison between the loudness of speech samples derived from parties to the conference during each frame to transmit the speech of the loudest party to the other parties to the conference. The conference is designed for use in a system using time division switching in which a plurality of multiple party conferences may be in operation simultaneously under the control of the conference circuit. Such conference circuits are shown generally by U.S. Pat. No. 4,022,981 issued May 10, 1977 to D. W. McLaughlin et al, and by U.S. Pat. No. 3,699,264 issued Oct. 17, 1972 to S. Pitroda et al.

The present circuit is designed for use on a small PBX, key system of the type shown generally by copending application Ser. No. 135,464 filed Mar. 31, 1980 and Ser. No. 194,209 filed Oct. 6, 1980, now U.S. Pat. No. 4,339,633 issued July 13, 1982 to F. Ahmed, and in the application of W. Williams and myself, Ser. No. 225,020, filed on the same day as the present application. The circuit of the present invention is directed to a smaller capacity system than that shown by the cited Ahmed applications, using only one processor for controlling call completion in the system.

SUMMARY OF THE INVENTION

The present invention is directed to a conference circuit for a small capacity telecommunication system using time division principles. In the system using the present circuit, a plurality of conference calls may be handled simultaneously, at least one conference having four party conference capability. For conferencing, a plurality of adjacent channels on the PCM bus are allocated for each conference call. Of the plurality of channels for one conference, a first group of channels is used to receive speech data, one such channel in the group for each party to the conference call. The next group of channels is allotted to the transmission of data for the conferring parties. Thus, for a three party conference, six channels are used, the first three for receiving and the last three for transmitting.

During the receive channels of a group, the speech samples as received are successively compared with the loudest sample to date. The resulting loudest sample from the receive channels are sent out during the subsequent transmission channels of that group. The loudest sample is however silenced during the transmission period for the channel over which the loudest sample was received.

In the present system, an incoming sample is received by a shift register and compared with a previously stored sample, the loudest sample for that conference to date. The incoming sample either becomes the stored sample, if found to be louder than the sample against which compared, or is erased if less loud. The loudest samples for all conferences in progress are stored in a loudest-party-memory for subsequent comparisons against the samples derived from the parties to its respective conference.

Further, the conference circuit may be used when the feature known as call waiting or camp-on is employed. This feature arises when a two-party conversation is in process. When this feature is in use, a call to one of the busy parties results in the call being transferred to control by the conference circuit and use of the conference channels so that a distinctive tone may be sent to the called party.

When such a call desiring the use of the camp-on feature is recognized, the call is shifted under processor control to conference channels and the camp-on tone is handled to an extent as a third party to the conversation. The camp-on tone is compared in a second comparator to the loudest signal as received from the loudest speaker comparator. The resulting loudest signal will be sent out, the camp-on being transmitted during the interval between tone pauses to the parties to the conversation.

In the system shown, up to five conferences can be accommodated, with capability in the loudest speaker store for storage of signals from the loudest party in all conferences.

BRIEF DESCRIPTION

Figure 5A:
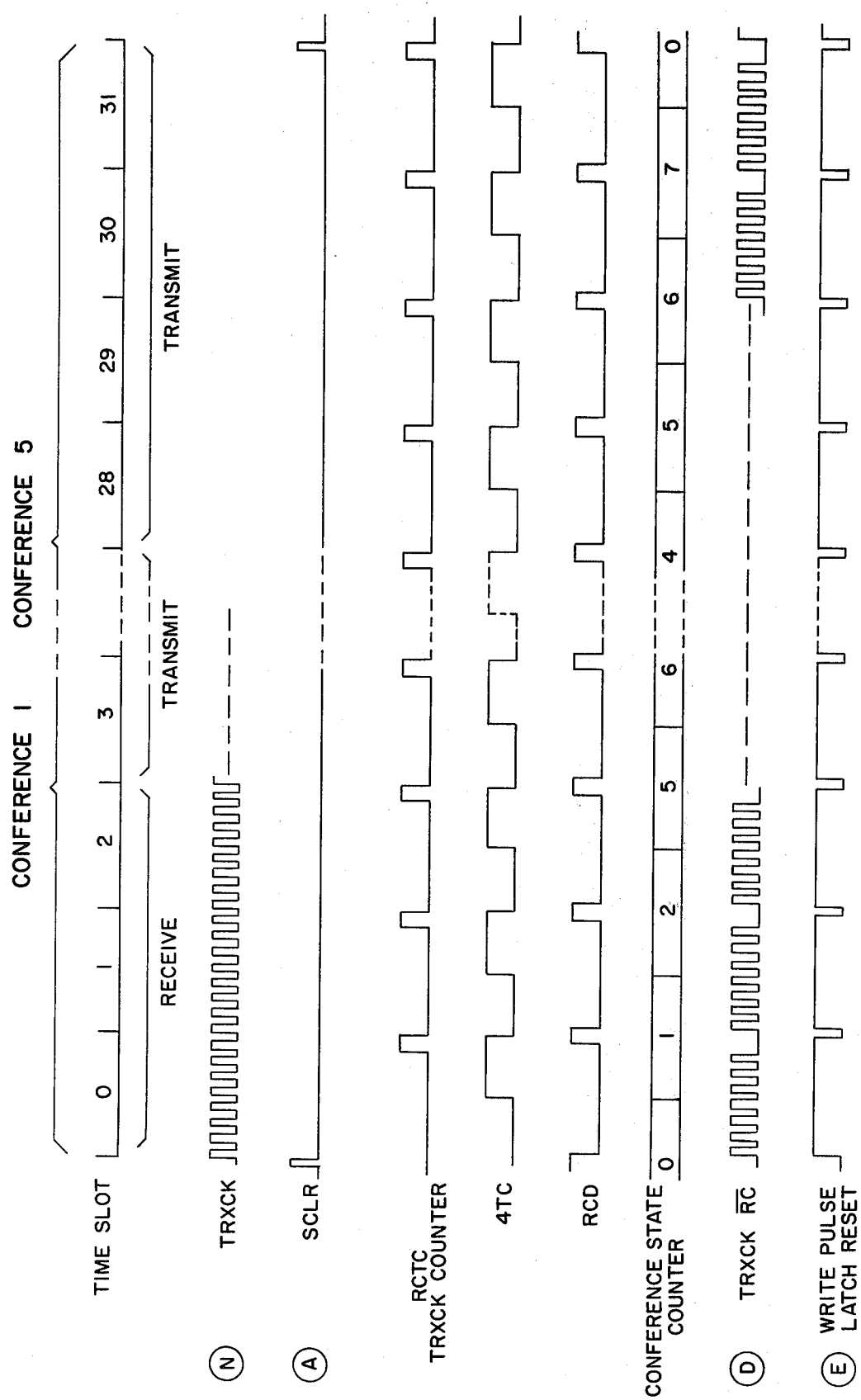
Figure 5B:
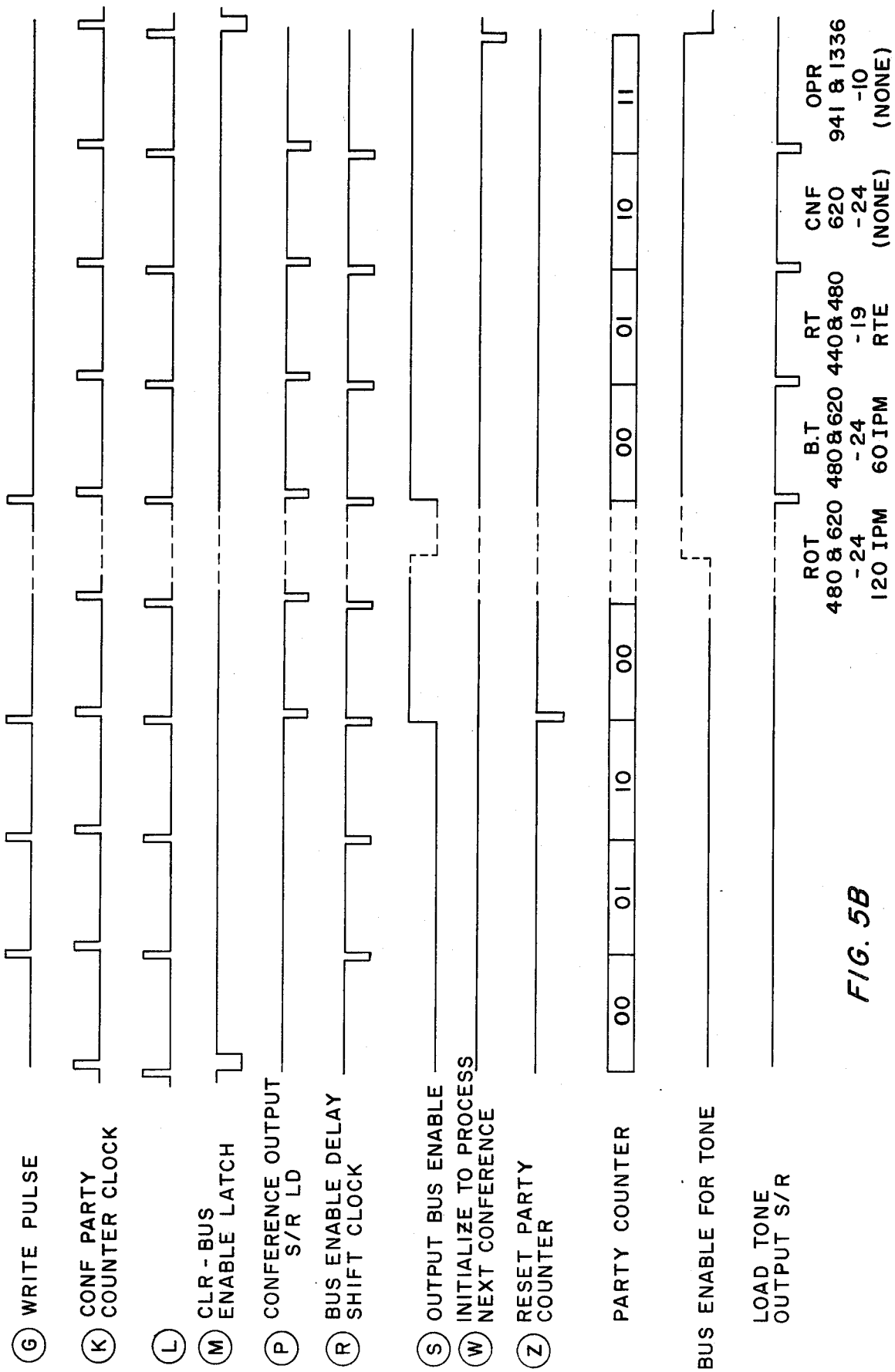

FIGS. 5A and B combinedly form a timing chart of the clocking applied to the diagram of FIGS. 3A–3D. (with the placement of figures having FIG. 5B placed below FIG. 5A.)

DETAILED DESCRIPTION

Figure 1:
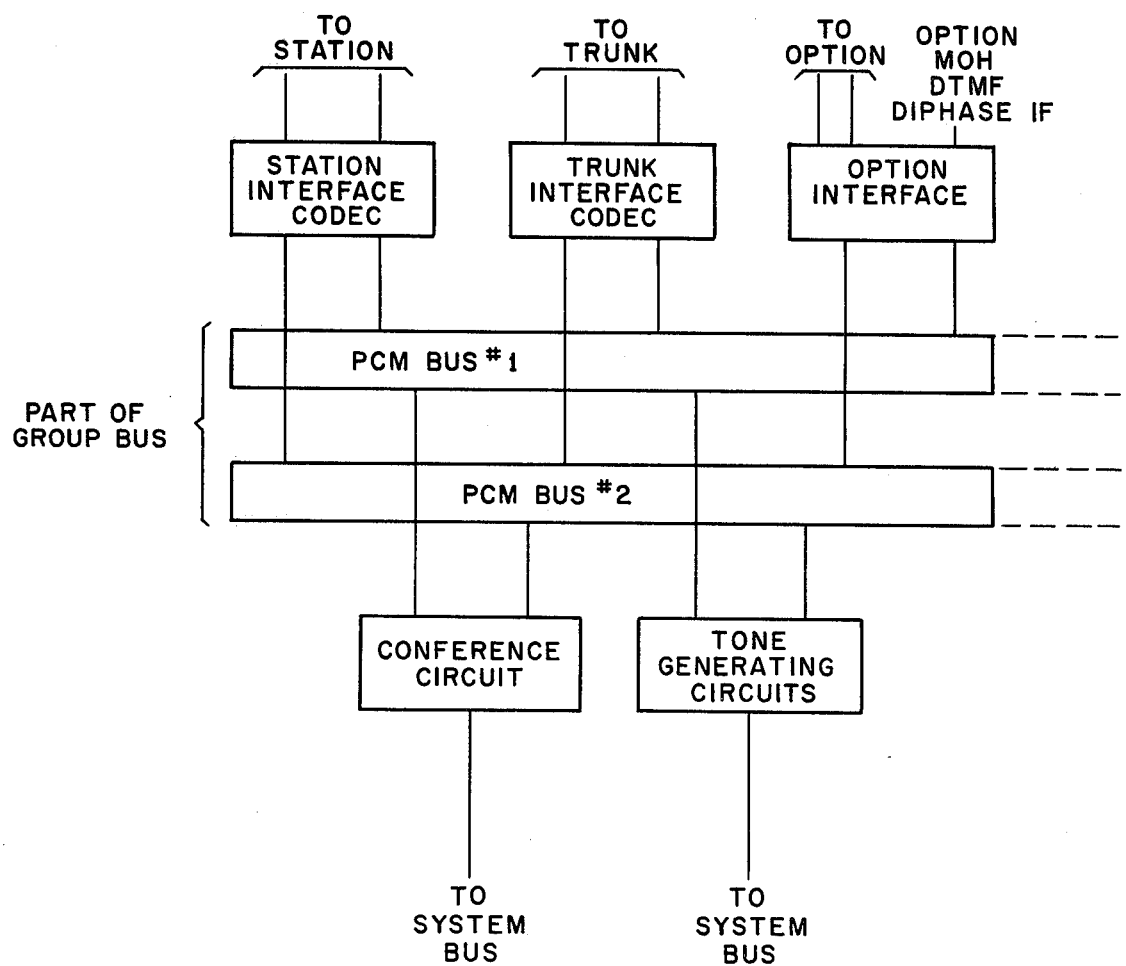
FIG. 1 is a block diagram of a portion of the telecommunications system to which my invention is applied.

In FIG. 1, I show in greater detail a portion of the system block diagram as shown in the patent application filed herewith for a Digital PBX System by W. Williams and myself.

In FIG. 1, there can be seen in block form the plural station, trunk and option interfaces for coupling the system ports to the PCM busses 1 and 2. In the system shown, data and signalling information in pulse coded format is bidirectionally transferred between an interface and a system port via the PCM busses. There are two parallel PCM busses each having a plurality of channels for the transfer of digital data. Preferably, each PCM bus may have 32 channels, each channel capable of handling eight bits of serial data, one such bit in each time slot.

Of the PCM busses, Bus #1 is used to handle normal two party calls on up to 25 of its channels. The final group of channels of Bus #1 is used to receive tones from a tone generator in the Tone Circuits for transmission to a receiving channel and station.

The second bus (Bus #2) is used primarily for conference calls. All stations and trunk interfaces have access to both busses for normal calls, receipt of tones and conference calls. Optionally, the second bus could be made available for use by two party calls under the control of the processor. Also, having access to the PCM busses are the common services circuits such as conference, tone, dial pulse register and control circuits.

Figure 2:
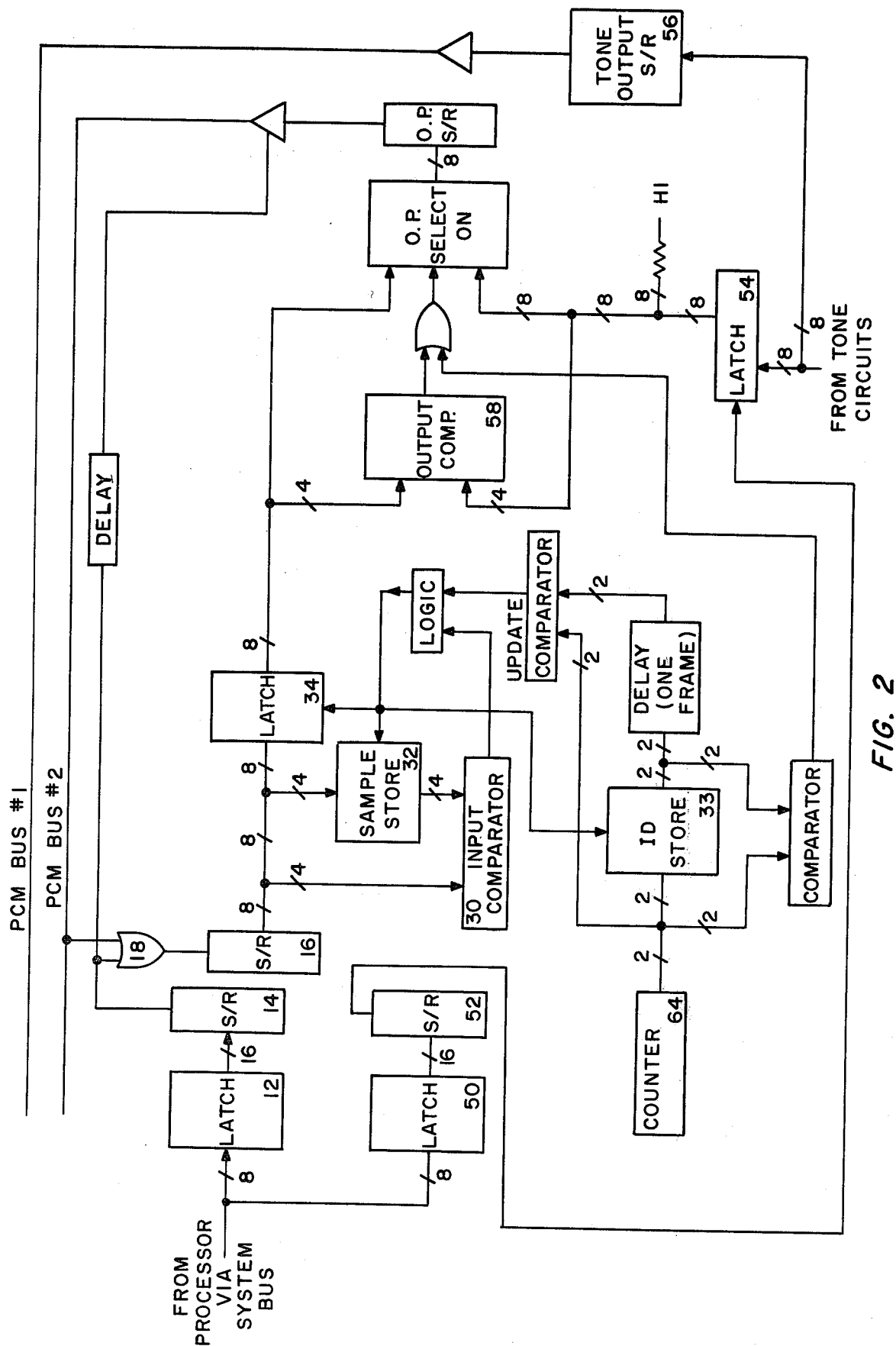
FIG. 2 is a block diagram of a conference circuit employing my invention.
Figure 3A:
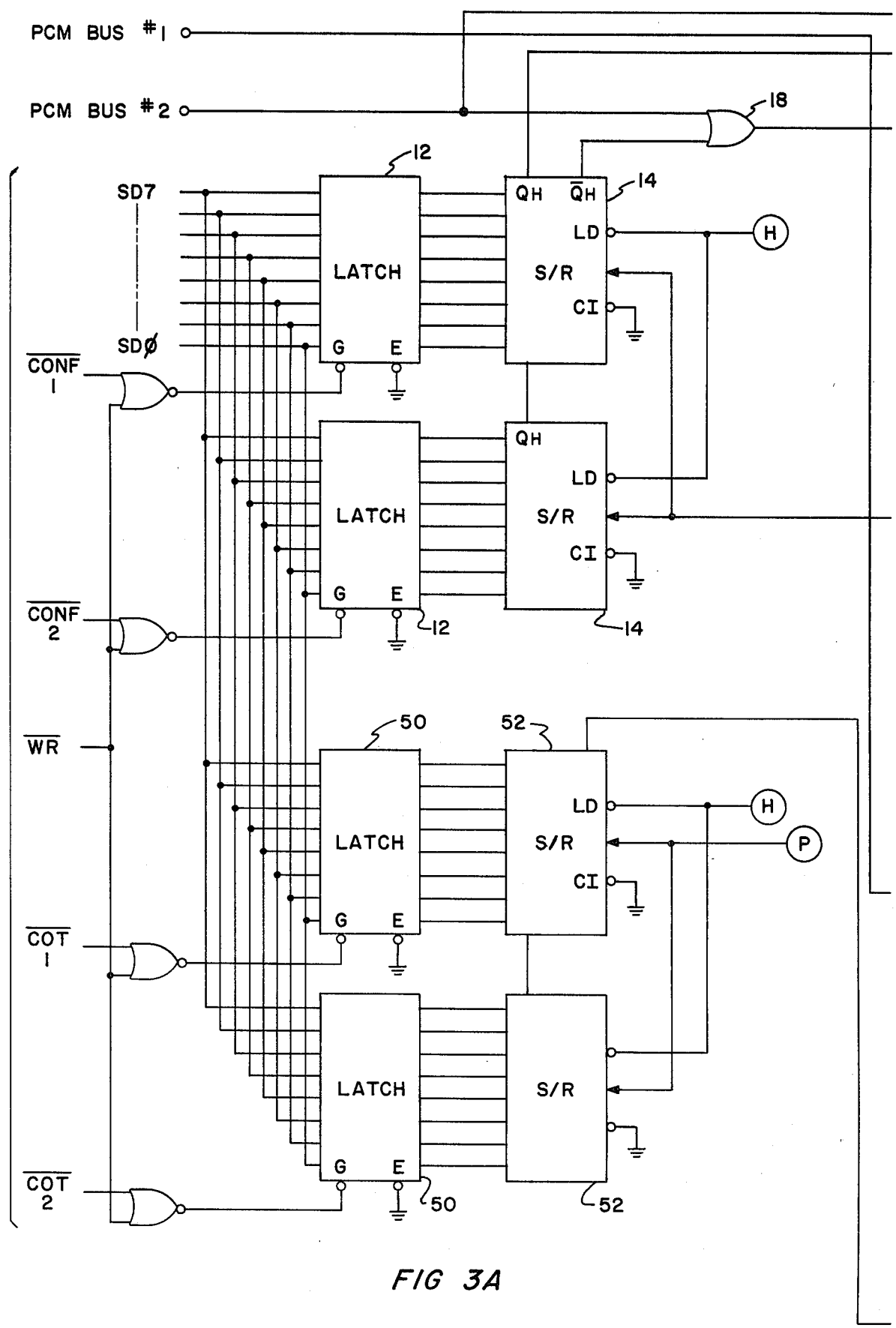
FIG. 3 is a block chart showing the arrangement of FIGS. 3A–3D to show the circuit of FIG. 2 in greater detail.
Figure 3B:
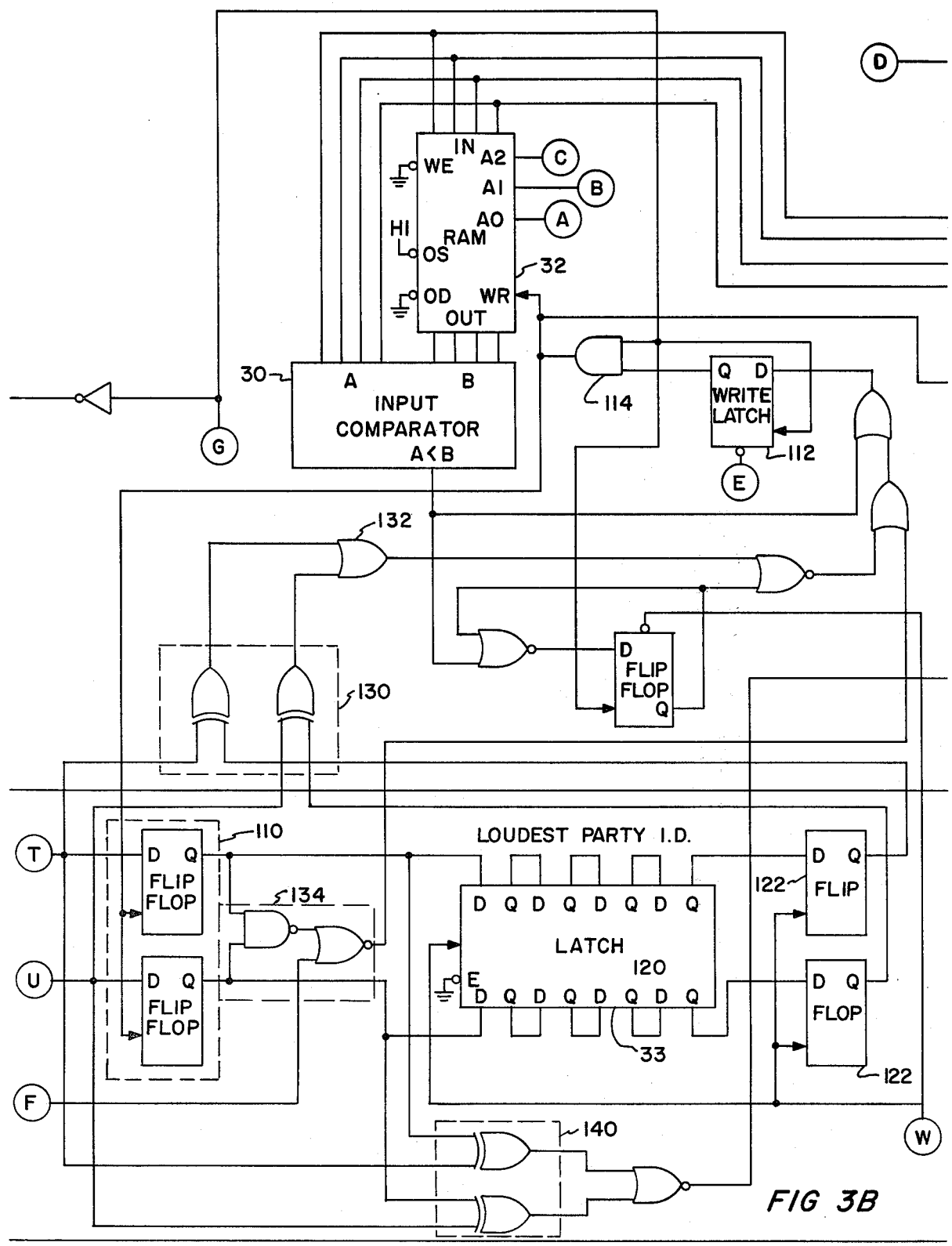
Figure 3C:
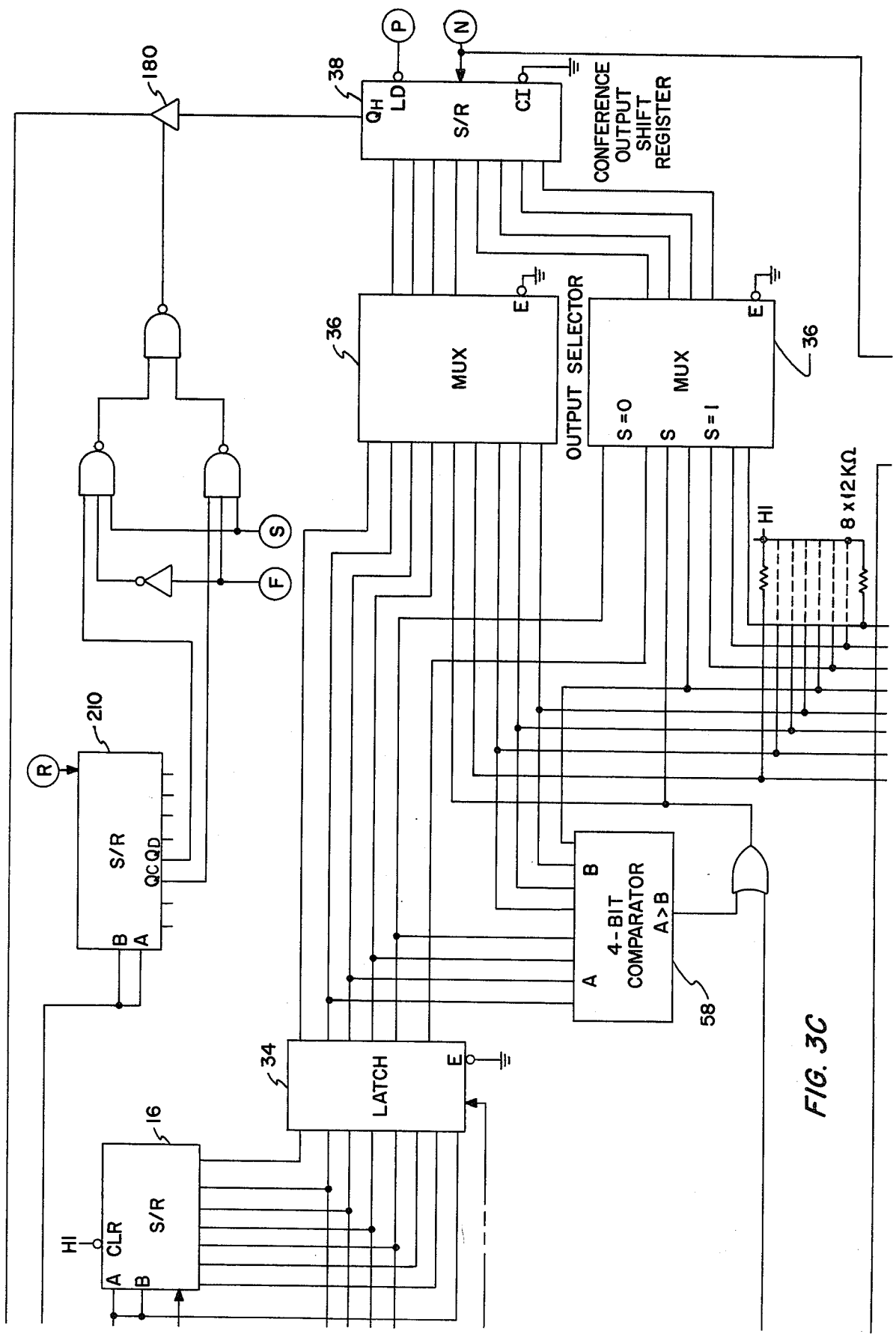

In FIG. 2, I show the conference circuit in simplified block form.

From the system processor, data is received by the conference circuit by way of the system data leads from the system bus. This data is transmitted in parallel to the Enable Latch 12 and to the parallel-in serial output shift register 14 denoting which channels are to be conferenced. This data is in the form of two eight bit words (16 bits total), where each bit enables the conference circuit to receive speech data during a certain channel and to transmit speech data during a certain later channel. Speech data from the stations during transmit channels allotted to the respective stations is fed from the conference PCM bus #2 to a serial-in-parallel-out shift register (S/R) 16, thru an enabling gate 18, this enabling gate being controlled by the enabling bits from register 14. The function of this gate 18 during a given channel is to either pass the speech data unaffected, or to force the speech data to the code representing silence, as will be explained. The four most significant magnitude bits from the parallel outputs of the input shift register 16 representing a sample from a channel are compared within an input comparator 30 against four bits from the output of the sample store 32. These latter four bits represent the four most significant magnitude bits which have been stored as representative of the loudest party for the conference in which the given channels are involved.

The current sample is compared within the input comparator 30 against the loudest sample from other stations of the conference stored to date. The logic output of comparator 30 is gated with the output of the update comparator. The output of this logic circuit will cause the new sample to be accepted as the loudest data if (1) the new samples comparison bits indicate the new sample represents a signal of larger magnitude than the signal represented by already stored loudest data, or (2) the party being processed is last frames loudest party (unless someone else in the conference has been found to be louder already). If the new sample is accepted, the speech data in S/R 16 is written into loudest sample latch 34, the comparison bits in S/R 16 are written into sample store 32, and the loudest party ID bits are written from counter 64 into ID store 33. The (identification data) ID of the loudest sample is also updated within the ID storage 33.

The loudest sample to date is also gated from the loudest sample latch in the camp-on tone stage which constitutes a second comparison stage.

For the camp-on feature, there is a set of enable latches 50 receptive of data words from the processor indicating the need for camp-on tone. These words are fed to a parallel in-serial out shift register 52 to enable the camp-on tone latch 54 for the receipt of camp-on tone signals from the tone circuits during the necessary time slot. Camp-on tones generated by the tone generator circuits during enabled time slots are fed to the latch 54 (camp-on tone latch) in the conference circuit and to the tone output shift register 56 for direct emission of tones other than camp-on tones, these latter tones being sent to the normal call bus, bus #1. From the latch 54, the four most significant bits from the tone are sent to the output comparator 58 for comparison. In the comparator, the four bits are compared against those received from the loudest sample latch 34 to see if the loudest data sample or camp-on tone is to be sent out. If the camp-on tone is found by the comparison to be the loudest, then the output shift register 38 is enabled to send the tone to the party being notified of the camp-on call. Otherwise loudest speech data is transmitted to conferring parties by the output shift register 38.

The speech data from the loudest party must be prevented from reaching the party having generated the loudest signal. To perform this prevention, the identification of the party having generated the loudest signal must be retained. Conference party ID bits are received from the counter 64 and the data fed to the loudest party ID storage latch 33. This information is updated for each louder sample received.

The loudest sample for a conference resulting from the comparisons during one frame are retained for the next frame. Loudest sample is sent to the other conference stations when the last conference station has been compared.

Figure 4:
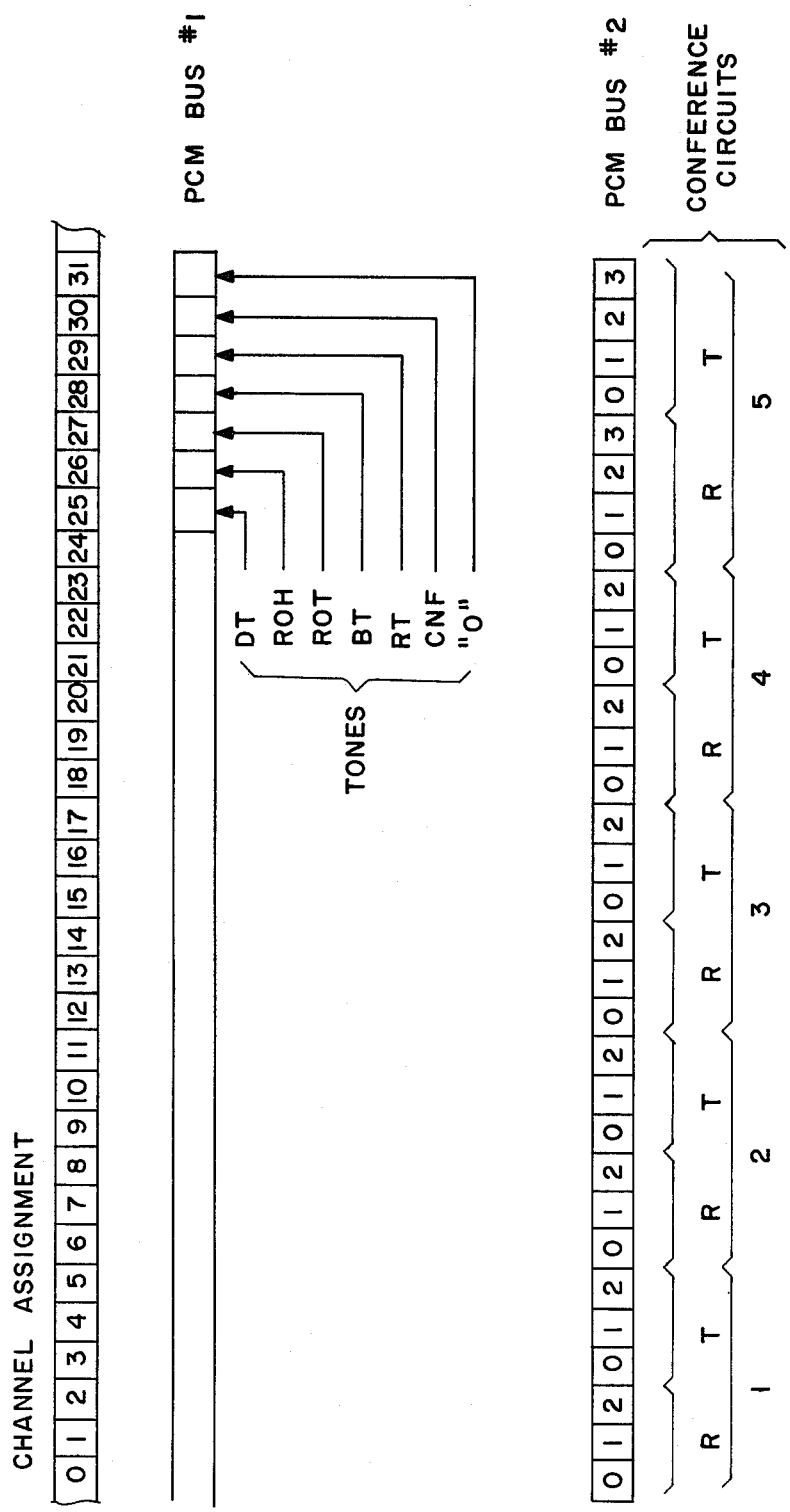
FIG. 4 is a timing chart of the PCM busses.

As viewed on the time chart of FIG. 4, the channels on the conference PCM bus are allotted by the processor on a first come, first served basis. For example-conference #1 would be allotted channels 1-3 for receive 4-6 for transmit (three station conference), the next conference would get channels 7-9 for receive 10-12 for transmit. One four station conference is possible using channels 24-27 for receive and channels 28-31 for transmit. Timing on the normal PCM bus and on the conference bus are related so no storage is necessary.

On a three station conference, six consecutive channels are allotted to the conference, first three are receive, the next three transmit. Comparisons of loudest samples occur during the last bit of each receive channel, and cover the 2nd through 5th (first bit sign) (the most significant bits) received during that channel. During the following three channels, the full eight bit sample found to be loudest is read out during the two channels of the non-loudest parties.

Camp-on tone is sent during the first channel and will be stored in the camp-on tone latch for the next frame. Camp-on tone sample is updated during the first bit of the first channel. The camp-on tone is generated digitally in response to address generated by to the tone ROM.

The need for camp-on tone is recognized by the processor (controller) which assigns a three station conference to the conversation.

In FIG. 3, I show the conference circuit in greater detail. In that figure, there can be seen the leads constituting the bidirectional two PCM busses, the data and enabling leads from the processor and the system bus.

The enable latches 12 comprise two separate otcal latches which may be purchased as off the shelf integrated circuits. These latches receive indications over Conference 1 and Conference 2 leads, the identification of the conference being enabled. Leads SDO-7 provide enabling data for the specific conference channels during which data is to be stored. The data from latches 12 is fed to the serial in parallel out shift registers 14 once reset by a pulse over the H lead. Channel data is fed from the latches 12 to the eight bit parallel in, serial out shift registers. I have found that tri-state flip flops and latches operate successfully as the latches.

The enabling bits do not enable in the sense of use of an AND gate but instead are fed to an OR gate (enabling gate 18) which forces PCM data for a channel to the silent code by raising the data to logic one.

Speech data from the PCM Bus #2 is fed serially through the enabling gate 18 to serial in parallel out shift register 16. Data from this shift register passes to the input comparator 30 for comparison with previously stored data from the RAM (sample store 32). Leads A, B and C to this RAM provide a binary indication of the conference 1-5 for which data is being processed, the binary data representing the output of a conference counter (not shown). The four most significant bits of the speech sample for a conference are used for comparison and the loudest sample is sent in parallel to the loudest sample latch 34, octal D flip flop.

During a conference, the identification of the loudest party to date is stored in the flip flops 110 by a pulse from write latch 112 and AND gate 114 during the G (write) pulse FIG. 4 from the counter (not shown). The binary inputs T and U to this flip flop provide the identification of the party (1-4) to the conference being processed. This data is stored in the loudest party ID flip flop grouping 120 which is a tri-state octal flip flop which acts as a serial in, parallel out shift register. The identification of the loudest party to the conference for the last frame is stored in D flip-flops 122. The ID bits in these flip flops 122 designate the party whose four speech bits are sitting at the B input to comparator 30. When an updated loudest party ID is received from the input comparator via write latch 112, the new ID data is stored in flip flop 110 and forwarded to flip flop group 112.

The Exclusive OR gate 130 compares the binary timing or counting bits from the T and U terminals designating the conference parties against the ID bits for the last frames loudest party. OR gate 132 provides the indication if anyone is louder this frame than the loudest from last frame to signal the write latch 112.

The NAND-NOR combination 134 (FIG. 3B) is operative on a power-up situation to ensure that any indication of a fourth party having been loudest last frame does not occur for a three party conference. A signal on the F terminal is only present when a four party conference is being processed to approve a fourth party as the loudest. With no signal from the F terminal (signifying a three party conference), then any indication of loudest fourth party to a conference will be erased. Any other loudest party identification will be transmitted.

The other Exclusive OR grouping 140 is used in when the loudest party data is being forwarded to the output selector to provide an indication of the party who is to receive the silent signal, i.e., the loudest party.

The tone generation in the circuit of FIG. 3 is developed in PCM or digital format within tone waveform ROM 160 (FIG. 3D) based on stored data. The stored data is read out of the ROM in order by an address generated by counters 162 and 164. Interrupt data for the tones are generated by the data selector 166 or conference state indications on leads AA-CC and forwarded through ROM 160. This interrupt data for all tones produces a binary signal which enables the ROM outputs which override the pull-up action of resistors 170, which would otherwise produce a silent period during the occurrence of the tone. For tones other than camp-on, i.e. Ring tone, Busy tone, Reorder tone, Dial tone etc, these tones are sent to the tone output shift register 172 for transmission on PCM Bus #1 during the allotted channel via the tri-state device 174.

Camp-on tone is sent from ROM 160 to Camp-on tone latch 54. The outputs of this octal latch 54 are digital representations of tone periods and silent periods. The four most significant bits from latch 54 are sent to the B input of comparator 58 (FIG. 3C) for comparison with loudest party samples from latch 34. The eight bits of the louder of the sample, camp-on or voice are sent to the two-to-one data selector (two quad, two input multiplexer) 36. Since the output of the circuit is in serial form, a parallel in-serial output shift register 38 is used to transmit the serial data through the tri-state device 180 to the PCM Bus #2.

When the camp-on tone is found to be the loudest tone, the camp-on tone is sent. When a silent period in the camp-on tone is reached, the prior loudest party data will be sent.

To prevent loudest party data from reaching the party having originated the loudest sample, the outputs of latch 54 are kept at logic one or high to pull the loudest party speech to the silent level, in effect erasing its speech output during the time channel for receipt of data by the then loudest party.

In addition, a delay of 3 or 4 bit is imposed by shift register 210 (FIG. 3C), a serial in, parallel out shift register, with four party sensing provided by the count on the F terminal to the NAND circuit 212, the circuit controlling the tri-state device 180.

With the system as shown, conference data in PCM format is sent to the conference PCM bus with camp-on tones fed to a party to a conference generated by the camp-on feature.

What is claimed is:
1. A conference circuit for a telecommunications system in which speech data for conference calls is transmitted internally in digital form over a plurality of time division channels in recurring time frames, said circuit comprising: means for storing digital samples of speech from each conference call, first comparison means, means for transferring digital samples for a call from said storing means for comparison in said first comparison means with a current sample received from said call, means for storing the current sample in said storing means in place of the previously stored sample when the current sample indicates greater amplitude than the previously stored sample, a second comparison circuit, a tone generator, means for enabling a digital signal output from the tone generator representative of a tone for transmission to said second comparison circuit, said second comparison circuit compares the greater amplitude sample from the first comparison circuit with the digital tone representation to determine which signal input to the second comparison circuit is louder, and means for transmitting at the end of a frame a signal representing the louder signal from said second comparison circuit to said time division channels.

2. A conference circuit for use in a multiple channel, multiple bus time division telecommunications system in which the channels of a first bus are used for transmitting digital speech samples between two-party conversation calls and in which the channels of a second bus are used for processing digital samples from parties to a conference call for transmission, the circuit comprising a first comparator means for comparing representative digital samples of speech derived from channels of said second bus for transmitting only samples from the channel exhibiting the greatest amplitude among samples from parties to a conference call, means in said circuit for generating digital representations of a tone, second comparator means, means for enabling passage of said digital tone representations from said generating means to a first input of said second comparator means on selection thereof, said second comparator means having a second input receptive of the greatest amplitude sample from said first comparator means for amplitude comparison against the amplitude of the digital tone representation to provide an entire sample exhibiting the loudest amplitude, and means for receiving the entire sample exhibiting the loudest amplitude from the second comparator means for transmission to a channel of said second bus.

3. A conference circuit as claimed in claim 2, in which there is a data selector for generating interrupt data for separating predetermined tones, said data selector generating a binary signal to the second comparator means to thereby prevent a silent period during the generation of interrupt data.

4. A conference circuit as claimed in claim 2, said conference circuit comprising an output multiplexer and a shift register for returning the loudest sample to the system over the second bus.

* * * * *